(12) United States Patent
Zeng

(10) Patent No.: US 11,272,053 B2
(45) Date of Patent: Mar. 8, 2022

(54) CHANNEL-BASED VOICE CALL METHOD AND APPARATUS

(71) Applicant: GUANGZHOU HUADUO NETWORK TECHNOLOGY CO., LTD., Guangzhou (CN)

(72) Inventor: Yan Zeng, Guangzhou (CN)

(73) Assignee: Guangzhou Huaduo Network Technology Co., Ltd., Guangzhou (CN)

( * ) Notice: Subject to any disclaimer, the term of this patent is extended or adjusted under 35 U.S.C. 154(b) by 0 days.

(21) Appl. No.: 17/309,477

(22) PCT Filed: Nov. 21, 2019

(86) PCT No.: PCT/CN2019/119965
§ 371 (c)(1),
(2) Date: May 28, 2021

(87) PCT Pub. No.: WO2020/108378
PCT Pub. Date: Jun. 4, 2020

(65) Prior Publication Data
US 2021/0392226 A1 Dec. 16, 2021

(30) Foreign Application Priority Data
Nov. 30, 2018 (CN) .......................... 201811456014.9

(51) Int. Cl.
*H04M 3/42* (2006.01)
*H04M 3/22* (2006.01)
*H04L 9/32* (2006.01)

(52) U.S. Cl.
CPC .......... *H04M 3/42059* (2013.01); *H04L 9/32* (2013.01); *H04M 3/2209* (2013.01); *H04M 3/2263* (2013.01); *H04M 2203/6072* (2013.01)

(58) Field of Classification Search
None
See application file for complete search history.

(56) References Cited

U.S. PATENT DOCUMENTS

2006/0178167 A1    8/2006  Tamura et al.
2008/0266466 A1   10/2008  Yamagishi et al.

FOREIGN PATENT DOCUMENTS

CN    101309391 A    11/2008
CN    101442741 A     5/2009
(Continued)

OTHER PUBLICATIONS

International search report in PCT application No. PCT/CN2019/119965 dated Feb. 3, 2020.
(Continued)

*Primary Examiner* — Antim G Shah
(74) *Attorney, Agent, or Firm* — Knobbe, Martens, Olson & Bear, LLP

(57) ABSTRACT

A channel-based voice call method, including: accepting a matching request of a client, acquiring a matching result of the client from a matching pool, and returning the matching result to the client; and acquiring a call matching acceptance instruction of the client, allocating a temporary channel and locking the temporary channel, and sending a successfully accepted matching message, a temporary channel number and a channel password to the client, such that the client enters the temporary channel based on the successfully accepted matching message, the temporary channel number and the channel password to make a call.

9 Claims, 3 Drawing Sheets

(56) References Cited

FOREIGN PATENT DOCUMENTS

| CN | 101547208 A | 9/2009 |
| CN | 101938624 A | 1/2011 |
| CN | 103338215 A | 10/2013 |
| CN | 103686438 A | 3/2014 |
| CN | 103701690 A | 4/2014 |
| CN | 103731281 A | 4/2014 |
| CN | 103746821 A | 4/2014 |
| CN | 104539433 A | 4/2015 |
| CN | 104661266 A | 5/2015 |
| CN | 105100523 A | 11/2015 |
| CN | 105792193 A | 7/2016 |
| CN | 106231444 A | 12/2016 |
| CN | 106936788 A | 7/2017 |
| CN | 109462705 A | 3/2019 |
| KR | 20020089408 A | 11/2002 |
| WO | 2015101303 A1 | 7/2015 |
| WO | WO-2015101300 A1 * | 7/2015 ............ H04L 51/00 |

OTHER PUBLICATIONS

First office action in Chinese application No. 201811456014.9 dated Dec. 20, 2019.
Notification to grant patent right for invention in Chinese application No. 201811456014.9 dated Mar. 17, 2020.

* cited by examiner

CHANNEL-BASED VOICE CALL METHOD AND APPARATUS

CROSS-REFERENCE TO RELATED APPLICATION

The present disclosure is a US national phase application of international application No. PCT/CN2019/119965, filed on Nov. 21, 2019, which claims priority to Chinese Patent Application No. 201811456014.9, filed on Nov. 30, 2018 and titled "CHANNEL-BASED VOICE CALL METHOD AND APPARATUS", the disclosure of each of which is incorporated herein by reference in its entirety.

TECHNICAL FIELD

The present disclosure relates to the field of a voice call technology, and more particularly to a channel-based voice call method and apparatus.

BACKGROUND

Voice call is one of indispensable technologies in modern society. A person can control a client A (which may be a client on a mobile phone, a tablet computer, or a computer) to make a voice call with a person on another client B, which is more convenient than a traditional method of making a telephone call.

In the past, a voice call was mainly implemented through a VOIP protocol. This method is relatively low in bit rate and relatively poor in sound quality, and the transmission protocol is mainly transmitted through an RTP protocol, which is easy to lose packets.

Therefore, there is an urgent need to propose a new voice call method to solve technical problems of low bit rate, relatively poor sound quality and easy packet loss of traditional voice calls.

SUMMARY

According to a first aspect of the present disclosure, a channel-based voice call method is provided. The method includes:

accepting a matching request of a client, acquiring a matching result of the client from a matching pool, and returning the matching result to the client; and acquiring a call matching acceptance instruction of the client, allocating a temporary channel and locking the temporary channel, and sending a successfully accepted matching message, a temporary channel number and a channel password to the client, such that the client enters the temporary channel based on the successfully accepted matching message, the temporary channel number and the channel password to make a call.

According to a second aspect of the present disclosure, a channel-based voice call apparatus is provided, which includes a processor and a memory, wherein the memory is configured to store a program code therein and transmit the program code to the processor; and the processor is configured to execute the channel-based voice call method according to the first aspect based on an instruction in the program code.

According to a third aspect of the present disclosure, a computer-readable storage medium is provided. The storage medium is configured to store a program code therein, the program code being configured to execute the channel-based voice call method according to the first aspect.

BRIEF DESCRIPTION OF THE DRAWINGS

To describe the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure provides a channel-based voice call method and apparatus, which are configured to solve technical problems of low bit rate, relatively poor sound quality and easy packet loss of traditional voice calls.

In order to make the purposes, features, and advantages of the present disclosure more obvious and understandable, the technical solutions in the embodiments of the present disclosure will be described clearly and completely in conjunction with the accompanying drawings in the embodiments of the present disclosure. Apparently, the embodiments in the following description are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
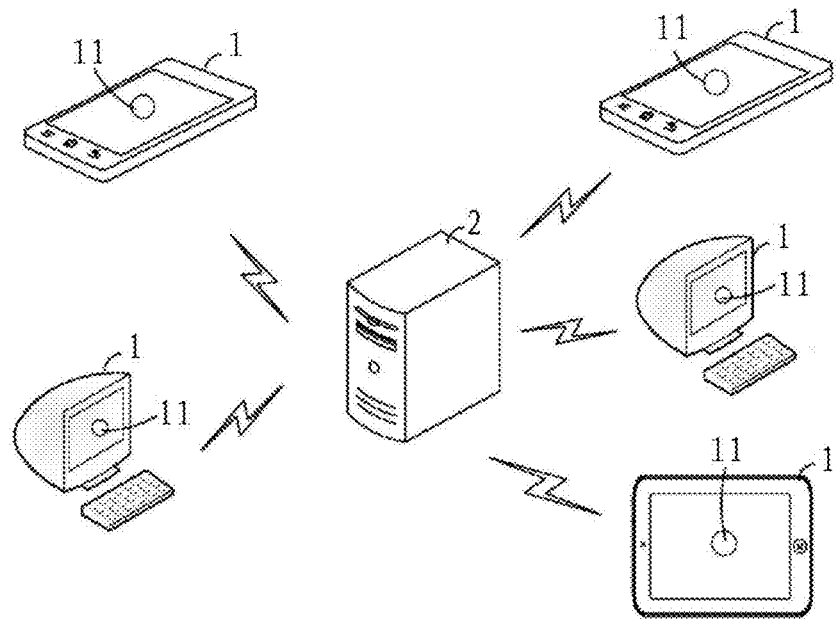
FIG. 1 is a schematic diagram of a system applicable to a channel-based voice call method provided by the present disclosure.

It should be understood that the present disclosure provides a system which is applicable to a channel-based voice call method. FIG. 1 is a system architecture diagram in an embodiment of the present disclosure. As shown in FIG. 1, a user terminal 1, a client 11, a service terminal 2, a business service back-end, and a channel server are included in FIG. 1. It can be understood that the client 11 is a computer program product containing instructions, which is installed on the user terminal 1. The user terminal 1 may be a product such as a mobile phone, a tablet computer, or a PC. The business service back-end is a computer program product containing instructions, which is installed on the service terminal 2. The service terminal 2 may be a server, a PC, or other product. The channel server may be a server that provides a temporary channel for making a call, such as a voice channel server and a live channel microphone-connected server. The temporary channel refers to a temporarily established channel, which is not bound to a UID of the client and can be recycled. The same channel number may be reused by different users at different times, and the channel number of the temporary channel is not open to the public. However, a fixed channel that is different from the temporary channel is bound to a UID of an anchorperson or an ID of a union, without a recycling process. Once bound, the fixed channel will be permanently bound. The user starts broadcasting with this fixed channel number. Before the channel-based voice call method is implemented, the business service back-end will apply for a batch of channel number segments from the channel server (the length of each channel number segment depends on the number of users), which are generally temporary channels.

Figure 2:
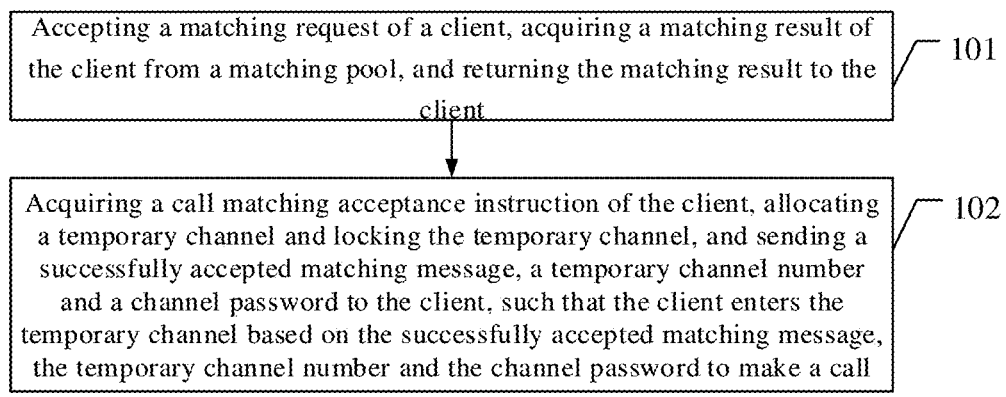
FIG. 2 is a schematic diagram of an embodiment of a channel-based voice call method provided by the present disclosure.

Referring to FIG. 2, the present disclosure provides an embodiment of a channel-based voice call method, which includes the following steps.

In step 101, a matching request of a client is accepted, a matching result of the client is acquired from a matching pool, and the matching result is returned to the client.

When the client needs to initiate a call in a random matching mode, the client sends a protocol of starting random matching to the business service back-end. When the business service back-end receives the random matching protocol, the server will put an ID of a user who is sending a random call into the matching pool, and match a group of users according to certain rules (such as opposite sex match priority, age proximity priority, location proximity priority, and constellation proximity priority). In the case of a multi-person call, multiple groups of users are randomly matched according to the above rules.

In step 102, a call matching acceptance instruction of the client is acquired, a temporary channel is allocated and locked, and a successfully accepted matching message, a temporary channel number and a channel password are sent to the client, such that the client enters the temporary channel based on the successfully accepted matching message, the temporary channel number and the channel password to make a call.

The concept of channel being locked means that when broadcasting is performed through a current channel, a password will be added to this channel and if a user wants to enter this channel, the password must be input and verified, otherwise the user cannot enter. Therefore, the temporary channel cannot be entered until a corresponding client is matched.

According to the present disclosure, a call is made by entering the temporary channel after matching. Compared with the traditional VOIP protocol, the call bit rate is higher and the sound quality is better. In addition, the temporary channel by means of which the call is made can be recycled. The temporary channel is locked so as to prevent the call content in the channel from being eavesdropped.

The above description is a detailed description of an embodiment of a channel-based voice call method provided by the present disclosure. Another embodiment of a channel-based voice call method provided by the present disclosure will be described in detail.

Figure 3:
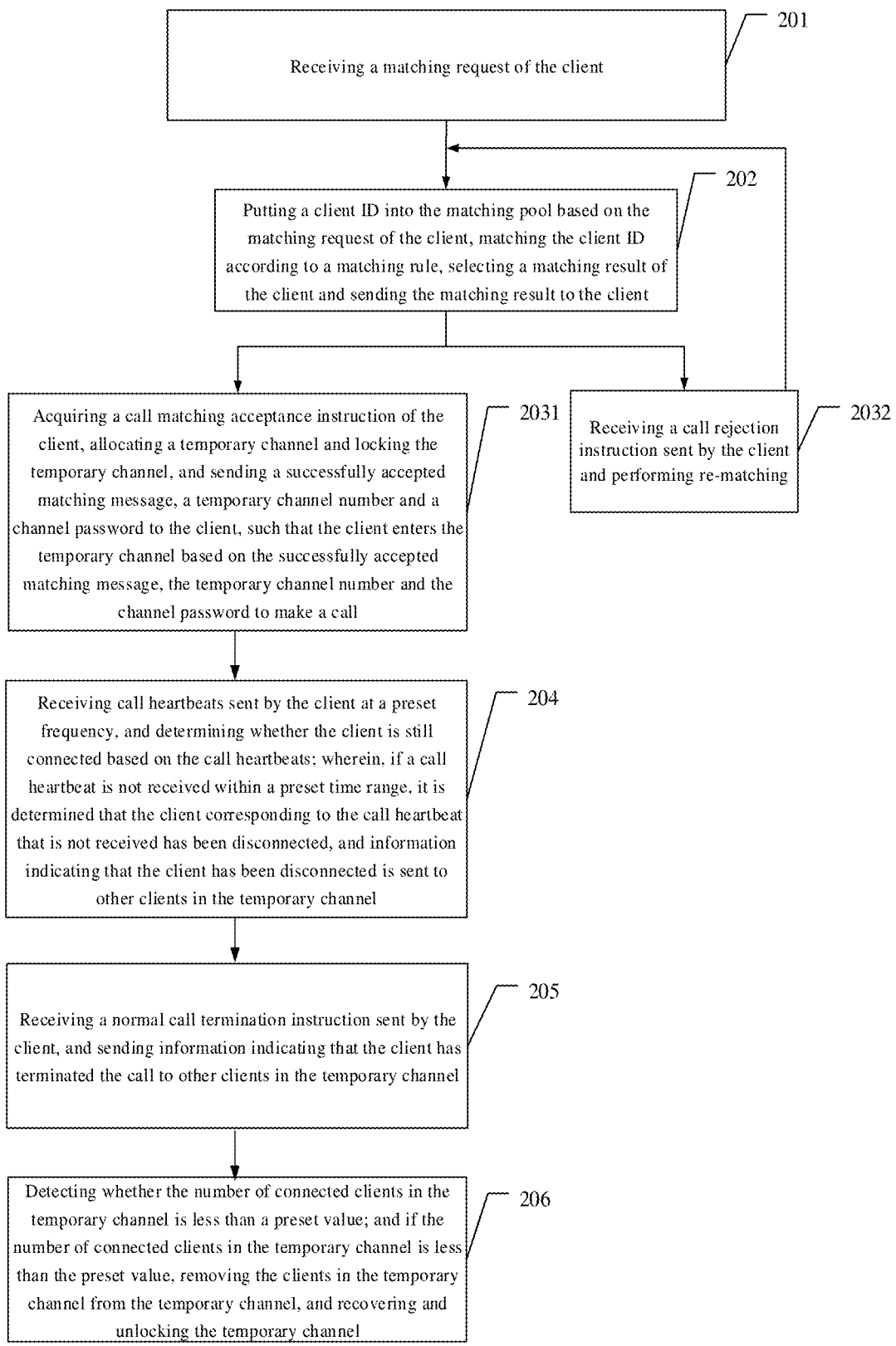
FIG. 3 is a schematic diagram of another embodiment of a channel-based voice call method provided by the present disclosure.
Figure 4:
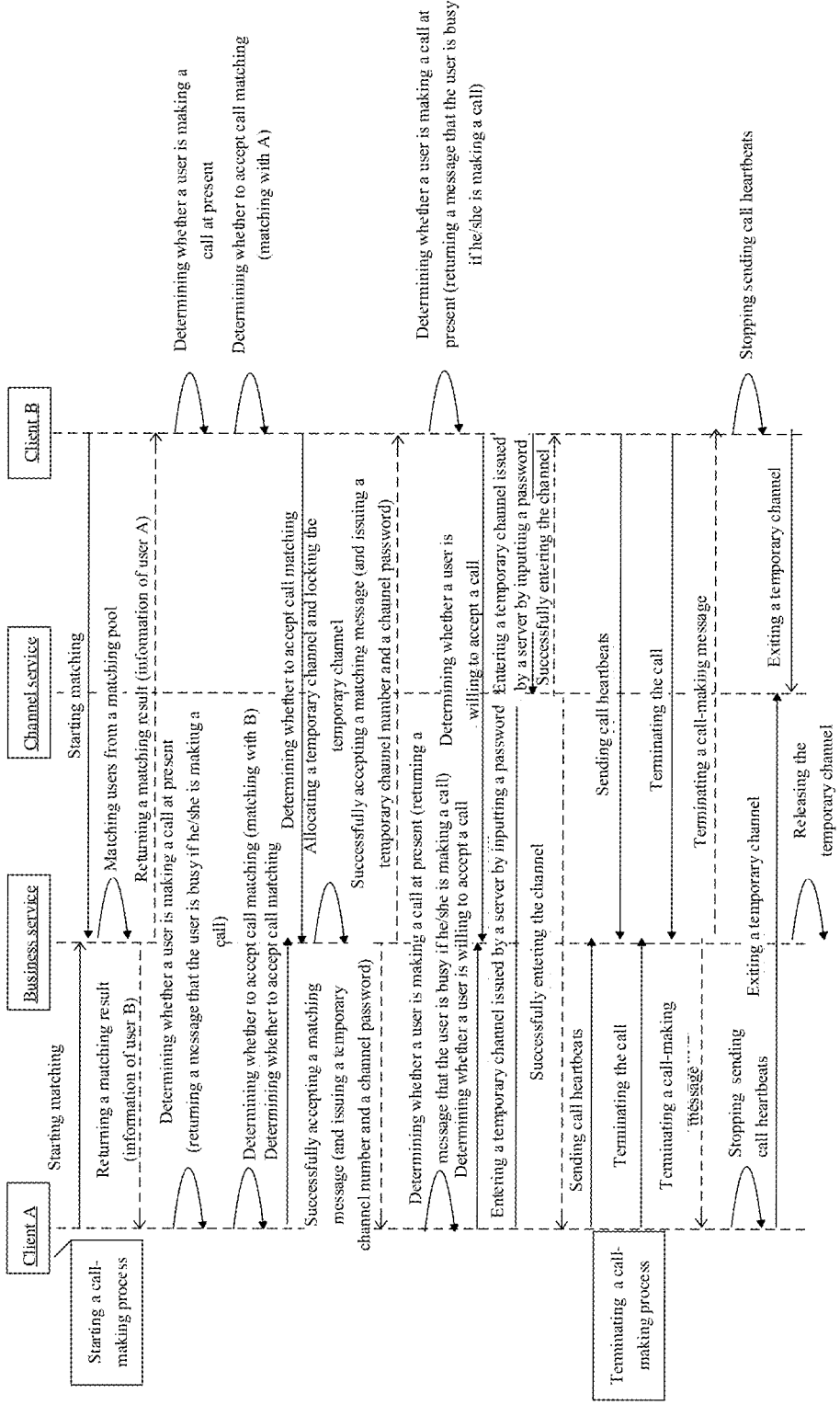
FIG. 4 is an interaction sequence diagram of a channel-based voice call method provided by the present disclosure.

Referring to FIG. 3 and FIG. 4, another embodiment of a channel-based voice call method provided by the present disclosure includes the following steps.

In step 201, a matching request of a client is accepted.

A user who wants to make a voice call in the client must be a logged-in user who has completed personal information. The personal information includes a user's nickname, head portrait, age, constellation, location, etc. If it is determined that the user has not filled in personal information, a prompt is made for the user to fill in first.

In step 202, a client ID is input into the matching pool based on the matching request of the client, the client ID is matched according to a matching rule, and a matching result of the client is selected and sent to the client.

The matching rule refers to differences in client characteristics, that is, when the business service back-end receives a random matching protocol, the server will put an ID of a user that is sending a random call into the matching pool, and match a group of users according to certain rules (such as opposite sex match priority, age proximity priority, location proximity priority, and constellation proximity priority). In the case of a multi-person call, multiple groups of users are randomly matched according to the above rules. The proximity priority here refers to the proximity of number value. For example, in the case of location proximity priority, the user's location may be expressed in latitude and longitude, the smaller the difference between latitude and longitude is (the smaller the difference is), the higher priority it will be matched. For example, in the case of constellation proximity priority, the difference of the same constellation may be specified as 0, and the difference of different constellations may be specified as 1 (other values are also available). Then, prior matching of the same constellation can be achieved. After all the differences (the differences in characteristics of the opposite sex, age, location, constellation, etc.) are added together, the minimum total value may be the matching result.

For example, if the matching result is that a client A is matched with a client B, the client B is a client matched by the client A and the client A is a client matched by the client B. The matched client ID and corresponding client information are sent to the client, such that the client displays the matched client information. If the user sees the client information (such as a nickname, age, gender, head portrait and constellation) displayed on the client, the user may select whether to match with the current user based on the user content displayed on an interface. If the user is unwilling to match with the current user, a step 2032 of re-matching proceeds; and if the user is willing to match with the current user, a call-making process is initiated (step 2031). If no selection is made after a set time limit is exceeded (here the default is one minute), the user is considered unwilling to make a call.

After the matching is completed, client IDs in the matching result are removed from the matching pool. For example, if the client A and the client B are matched, the client IDs of the client A and the client B are removed from the matching pool. At this time, if another user performs call matching, the user who has been successfully matched and is currently on the call would not be matched.

It should be noted that the above matching is random matching. If directional matching is required (that is, the client A specifies to match with the client B to make a call), the matching rule may be modified to match a specific client ID.

In step 2031, a call matching acceptance instruction of a client is acquired, a temporary channel is allocated and locked, and a successfully accepted matching message, a temporary channel number and a channel password are sent to the client, such that the client enters the temporary channel based on the successfully accepted matching message, the temporary channel number and the channel password to make a call.

After step 2031 is executed, step 204 to step 206 can be executed.

It should be noted that the client sends a protocol message (accept a call matching instruction) indicating whether to accept call matching to the business service back-end, and if another client also sends the protocol of accepting call matching to the business service back-end within a certain time limit (which can be pre-set), the server will allocate a temporary channel for them, open the temporary channel and lock the current temporary channel. The concept of channel being locked means that when broadcasting is performed through a current channel, a password will be added to this channel and if a user wants to enter this channel the password must be input and verified, otherwise the user cannot enter. The business service back-end sends channel information (including a channel number, channel password, channel type, etc.) established for the currently matched user to the client. In the process of initiating the call made by a client, if the client's counterpart is making a call, it is considered that the client's counterpart is busy, the server is informed by sending a message, and then the server sends the message to the client to tell the client that the counterpart is in a call and dial later.

In step 2032, a call rejection instruction sent by the client is received and re-matching is performed.

If the user is unwilling to make a call with the matched user, he/she may click a rejection button, and the client will then send a call rejection instruction. The call rejection instruction sent by the client is received, which can help the client perform re-matching. In order to not match with a repeated user, the business service back-end may generally write a rule of "not match with the user who is unwilling to make a call last time" into the matching rule. For example, when the client A and the client B are successfully matched but the client A is unwilling to talk to the client B, re-matching is performed and the matching between the client A and the client B will not be accepted (similar to a blacklist rule), and the next matching result may be searched (in this embodiment, matching is performed in the case of the smallest difference, and then a second smallest difference can be found as a second matching result), such as the matching between the client A and a client C.

In step 204, call heartbeats sent by the client at a preset frequency are received, and whether the client is still connected is determined based on the call heartbeats; if a call heartbeat is not received within a preset time range, it is determined that the client corresponding to the call heartbeat that is not received has been disconnected, and information indicating that the client has been disconnected is sent to other clients in the temporary channel.

When the two parties or a plurality of clients receive a message of successfully entering the channel, which is returned from the server, they will start to send call heartbeats to the business service back-end at a certain frequency (the call heartbeat is sent once every 10 seconds here, wherein the time is configurable). The business service back-end detects these call heartbeats and determines that the client is always on line. The server determines whether the current client is still connected based on the call heartbeats continuously sent by the client. If the server does not receive the heartbeats sent by the client within a certain time range, it is considered that the client has been disconnected, and a message is sent to the other party or parties to inform that the client has been disconnected.

It may be understood that if the client hangs up midway or is dropped midway due to network reasons, the client will stop sending the call heartbeats, and the business service back-end may learn that the client is disconnected.

In step 205, a normal call termination instruction sent by the client is received, and information indicating that the client has terminated the call is sent to other clients in the temporary channel.

It should be noted that after the client sends a normal call termination instruction, the call heartbeats will no longer be sent, and the business service back-end can determine that the client is disconnected according to step 204.

In step 206, whether the number of connected clients in the temporary channel is less than a preset value is determined; and if the number of connected clients in the temporary channel is less than the preset value, the clients in the temporary channel are removed from the temporary channel, and the temporary channel is recovered and unlocked.

If the number of users in the temporary channel is less than a certain value, for example, there is only one user in the channel, the user will be removed from the current temporary channel, and the current channel is recovered and unlocked. Of course, before the user is removed, the user will be informed that "there is no one in the channel".

FIG. 4 is an interaction sequence diagram of a channel-based voice call method provided by the present disclosure. FIG. 4 shows a process that the client A and the client B establish a temporary channel and make a call through the business service back-end. It may be understood that the business service back-end performs a channel-based voice call method provided by the present disclosure.

The present disclosure further provides a channel-based voice call apparatus, which includes a processor and a memory, wherein the memory is configured to store a program code therein and transmit the program codes to the processor; and the processor is configured to execute the channel-based voice call method of the above embodiment based on an instruction in the program code.

The present disclosure further provides a computer-readable storage medium, which is configured to store a program code therein, the program code being configured to execute the channel-based voice call method according to the above embodiment.

In summary, the above embodiments are merely used to illustrate the technical solutions of the present disclosure, but are not limited thereto. Although the present disclosure is described in detail with reference to the above embodiments, an ordinary person skilled in the art should understand: the technical solutions described in the foregoing embodiments may be modified, or some of the technical features may be equivalently replaced. However, these modifications and substitutions do not make the essence of the corresponding technical solutions depart from the spirit and scope of the technical solutions in the embodiments of the present disclosure.

What is claimed is:

1. A channel-based voice call method, comprising:
accepting a matching request of a client, acquiring a matching result of the client from a matching pool, and returning the matching result to the client;
acquiring a call matching acceptance instruction of the client, allocating a temporary channel and locking the temporary channel, and sending a successfully accepted matching message, a temporary channel number and a channel password to the client, such that the client enters the temporary channel based on the successfully accepted matching message, the temporary channel number and the channel password to make a call;
detecting whether a number of connected clients in the temporary channel is less than a preset value; and
if the number of connected clients in the temporary channel is less than the preset value, removing the clients from the temporary channel, recovering and unlocking the temporary channel.

2. The channel-based voice call method according to claim 1, wherein said acquiring the matching result of the client from the matching pool specifically comprises:

putting a client ID into the matching pool based on the matching request of the client, matching the client ID according to a matching rule, selecting a matching result of the client and sending the matching result to the client.

3. The channel-based voice call method according to claim 1, wherein said returning the matching result to the client comprises:
sending a matched client ID and corresponding client information to the client, such that the client displays matched client information.

4. The channel-based voice call method according to claim 1, after returning the matching result to the client, further comprising:
removing client IDs in the matching result from the matching pool.

5. The channel-based voice call method according to claim 1, after the client enters the temporary channel to make a call, further comprising:
receiving call heartbeats sent by the client at a preset frequency; and
determining whether the client is still connected based on the call heartbeats;
wherein, if a call heartbeat is not received within a preset time range, it is determined that the client corresponding to the call heartbeat that is not received has been disconnected, and information indicating that the client has been disconnected is sent to other clients in the temporary channel.

6. The channel-based voice call method according to claim 1, after the client enters the temporary channel to make a call, further comprising:
receiving a normal call termination instruction sent by the client, and sending information indicating that the client has terminated the call to other clients in the temporary channel.

7. The channel-based voice call method according to claim 1, after returning the matching result to the client, further comprising:
receiving a call rejection instruction sent by the client and performing re-matching.

8. A channel-based voice call apparatus, comprising a processor and a memory, wherein
the memory is configured to store a program code therein and transmit the program code to the processor; and
the processor is configured to execute the channel-based voice call method according to claim 1 based on an instruction in the program code.

9. A non-transitory computer-readable storage medium, being configured to store a program code therein, the program code being configured to execute the channel-based voice call method according to claim 1.

* * * * *